United States Patent
Mochizuki et al.

(10) Patent No.: US 6,182,800 B1
(45) Date of Patent: Feb. 6, 2001

(54) MULTIPLE FRICTION PLATE BRAKE DEVICE IN A BUGGY VEHICLE

(75) Inventors: Kikuo Mochizuki, Inasa-gun; Shinji Satou, Hamamatsu; Akikazu Ohno, Shizuoka; Tsuyoshi Abe, Hamakita, all of (JP)

(73) Assignee: Shin Nippon Wheel Industries Co., Ltd., Hamamatsu (JP)

( * ) Notice: Under 35 U.S.C. 154(b), the term of this patent shall be extended for 0 days.

(21) Appl. No.: 09/073,935

(22) Filed: May 7, 1998

(30) Foreign Application Priority Data

May 13, 1997 (JP) .................................................. 9-137561
Dec. 12, 1997 (JP) .................................................. 9-362540

(51) Int. Cl.$^7$ .............................. B60T 1/06; F16D 55/38
(52) U.S. Cl. ................ 188/71.5; 188/264 B; 188/264 E; 188/72.7; 188/18 A
(58) Field of Search .................... 188/71.5, 72.7, 188/72.9, 73.1, 82.74, 82.77, 82.84, 82.8, 82.9, 71.2, 264 CC, 264 B, 18 A, 71.6, 264 E, 264 D, 71.3, 71.4, 72.8, 2 D; 192/93 A, 70.23, 70.28, 70.12, 113.34; 475/125, 146, 145

(56) References Cited

U.S. PATENT DOCUMENTS

| | | | |
|---|---|---|---|
| 4,667,760 | * | 5/1987 | Takimoto ............................. 180/215 |
| 4,719,819 | * | 1/1988 | Tsutsumikishi et al. ............... 74/745 |
| 4,719,984 | * | 1/1988 | Watanabe .............................. 180/226 |
| 5,016,742 | * | 5/1991 | Peier . |
| 5,485,904 | * | 1/1996 | Organek et al. .................... 192/93 A |
| 5,775,457 | * | 7/1998 | Handa et al. ......................... 180/344 |
| 5,819,883 | * | 10/1998 | Organek et al. .................... 188/71.5 |
| 5,896,776 | * | 4/1999 | Handa et al. ......................... 74/424 |

FOREIGN PATENT DOCUMENTS

| | | |
|---|---|---|
| 60-163752 | 8/1985 | (JP) . |
| 1-28251 | 6/1989 | (JP) . |
| 411029013 * | 2/1999 | (JP) . |

* cited by examiner

Primary Examiner—Douglas C. Butler
(74) Attorney, Agent, or Firm—Arent Fox Kinter Plotkin & Kahn PLLC

(57) ABSTRACT

A brake for a buggy vehicle includes a plurality of rotatable friction brake plates which are axially slidably and relatively non-rotatably coupled to the input shaft of a reduction device spline-coupled to a propelling shaft, a plurality of stationary friction brake plates alternately superposed with the rotatable friction brake plates, a brake non-rotatable housing which houses the group of the rotatable and stationary friction brake plates therein and which supports said stationary friction brake plates for axially sliding movement and against rotation, a pressure-receiving portion provided in the brake housing to carry one side of the group of the rotatable and stationary friction brake plates, and an operating device capable of urging the other side of the group of the rotatable and stationary friction brake plates against the pressure receiving portion.

11 Claims, 5 Drawing Sheets

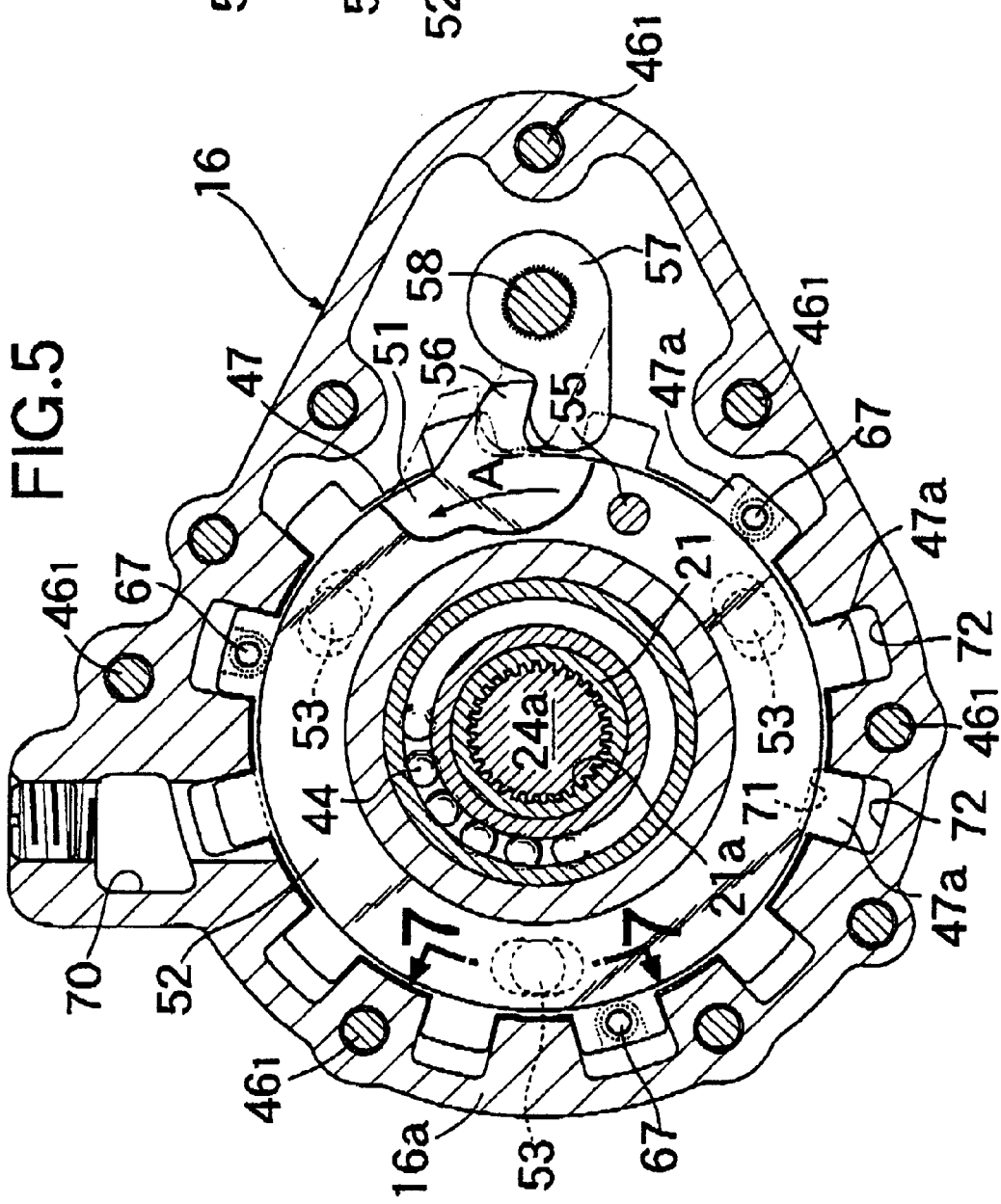

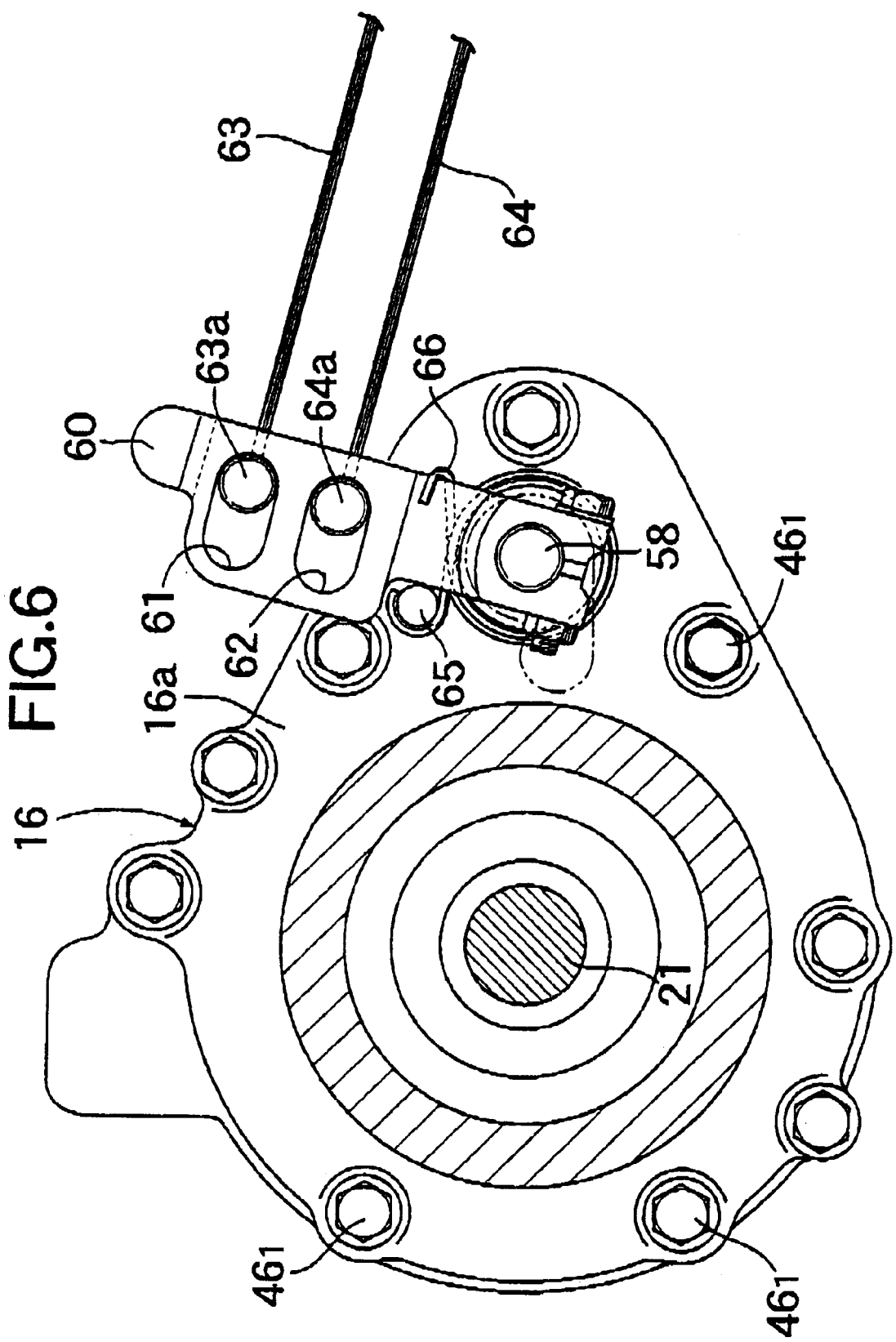

MULTIPLE FRICTION PLATE BRAKE DEVICE IN A BUGGY VEHICLE

BACKGROUND OF THE INVENTION

1. Field of the Invention

The present invention relates to a brake device in a buggy vehicle used mainly for traveling on an unleveled ground, and particularly, to a brake device for braking rear wheels in a buggy vehicle including a power unit, a propelling shaft connected to an output shaft of the power unit and extending longitudinally of the vehicle, a rear axle extending laterally of the vehicle, a reduction device which connects the propelling shaft and the rear axle to each other to reduce and transmit a power from the former to the latter, and a pair of left and right rear wheels each of which has a lower-pressure tire and which are mounted at opposite ends of the rear axle.

2. Description of the Related Art

In such buggy vehicle, it is especially required that the level of the brake device above the ground be set at as large a value as possible. so that a protrusion on the ground surface does not interfere with the brake device for the rear wheels during traveling of the vehicle on the unleveled ground. To meet such a requirement, a disk brake device has conventionally been proposed which includes a disk rotor secured to a propelling shaft for driving a rear axle at a reduced speed, as disclosed in Japanese Patent Application Laid-open No.60-163752. Such a brake device has an advantage that the torque transmitted to the propelling shaft is smaller than the torque applied to the axle and hence, the brake torque may be also relatively small and thus, it is possible to reduce the diameter of the disk rotor and to set the level of the brake device above the ground at a large value.

However, even though, the disk rotor mounted on the propelling shaft can be reduced in diameter, the whole brake torque must be produced by the single disk rotor and hence, there is a certain limit to the reduction in diameter. A disk brake having the disk rotor mounted on the propelling shaft is located at a position behind the power unit where it is hardly exposed to the wind produced by traveling of the vehicle. Therefore, a cooling property provided by the travel wind is far from an ideal level. Especially, if the disk brake is housed in a brake housing to prevent entering of the earth and sand, muddy water or the like, the reduction in cooling property of the brake device is inevitable.

SUMMARY OF THE INVENTION

Accordingly, it is a first object of the present invention to provide a brake device in a buggy vehicle of the above-described type, wherein even if the diameter of the brake device is reduced to further raise the level of the brake device above the ground, a sufficient braking force can be exhibited to reliably brake the rear wheels. It is a second object of the present invention to provide a brake device in a buggy vehicle of the above-described type, wherein the cooling property is improved, while achieving the above first object.

To achieve the above object, according to a first aspect and feature of the present invention, there is provided a brake device for a buggy vehicle including a power unit, a propelling shaft connected to an output shaft of the power unit and extending longitudinally of the vehicle, a rear axle extending laterally of the vehicle, a reduction device which connects the propelling shaft and the rear axle to each other to reduce and transmit a power from the propelling shaft to the rear axle, and a pair of left and right rear wheels which each have a lower-pressure tire and which are mounted at opposite ends of the rear axle, the brake device comprising a plurality of rotatable friction brake plates which are axially slidably and relatively non-rotatably coupled to the propelling shaft or a transmitting shaft rotated with the propelling shaft, a plurality of stationary friction brake plates alternately superposed with the rotatable friction brake plates, a non-rotatable brake housing which houses said pluralities of the rotatable and stationary friction brake plates therein and which supports the stationary friction brake plates for axial sliding movement and against rotation, a pressure-receiving portion provided in the brake housing to carry one of opposite sides of said pluralities of the rotatable and stationary friction brake plates, and an operating means capable of urging the other side of said pluralities of the rotatable and stationary friction brake plates against the pressure receiving portion.

With the first feature, the rear wheels can be braked through the propelling shaft, the reduction device, and the rear axle by operating the operating means to urge the rotatable and stationary friction brake plates against the pressure receiving portion. In this case, the brake torque applied to the propelling shaft is smaller than that applied to the axle as described above, and hence, the load of the brake device is relatively small and moreover, the brake torque is born substantially equally by the pluralities of rotatable and stationary friction brake plates. Therefore, the load of each of the friction brake plates is further alleviated and as a result, a reduction in diameter of the rotatable and stationary friction brake plates and in its turn, a reduction in diameter of the entire brake device is achieved, whereby the level of the brake device above the ground can be considerably raised. Therefore, it is possible for the buggy vehicle to easily travel on an unleveled ground without interference of the brake device with a large protrusion on the ground surface.

To achieve the second object, according to a second aspect and feature of the present invention, in addition to the first feature, the brake housing is connected to a reduction case in which the reduction device is housed, the reduction case and the brake housing being placed into communication with each other, so that lubricating oil stored in the reduction case is circulated between the reduction case and the brake housing by operation of the reduction device.

With the second feature, the inside of the brake device is lubricated and cooled by circulation of the lubricating oil between the reduction case and the brake housing, whereby the durability and cooling property of the brake device can be enhanced.

The above and other objects, features and advantages of the invention will become apparent from the following description of the preferred embodiment taken in conjunction with the accompanying drawings.

BRIEF DESCRIPTION OF THE DRAWINGS

FIG. 5 is a sectional view taken along a line 5—5 in FIG. 3;

FIG. 6 is a sectional view taken along a line 6—6 in FIG. 3; and

FIG. 7 is a sectional view taken along a line 7—7 in FIG. 5.

DETAILED DESCRIPTION OF THE PREFERRED EMBODIMENT

The present invention will now be described by way of an embodiment with reference to the accompanying drawings.

Figure 1:
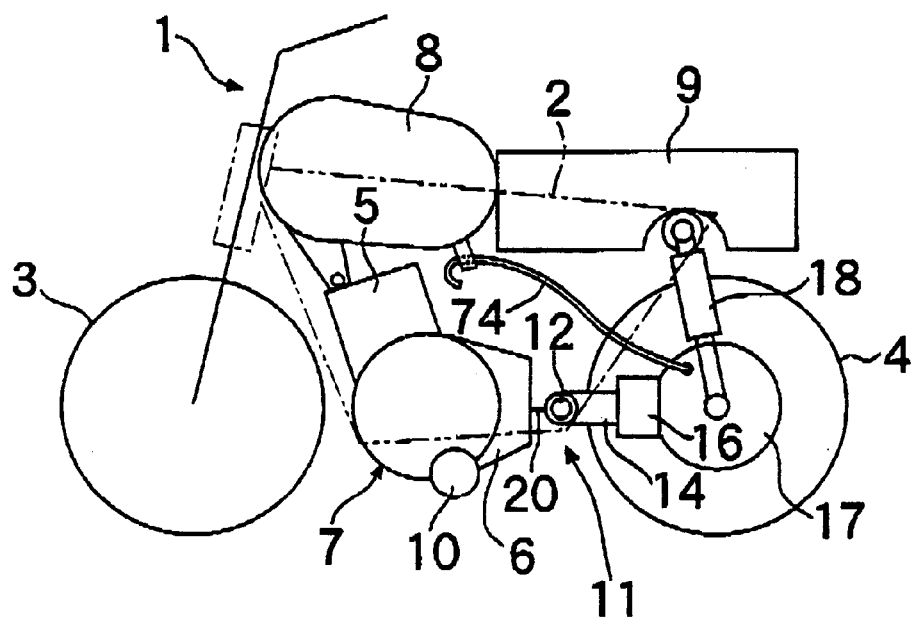
FIG. 1 is a schematic side view of a buggy vehicle provided with a brake device according to the present invention.
Figure 2:
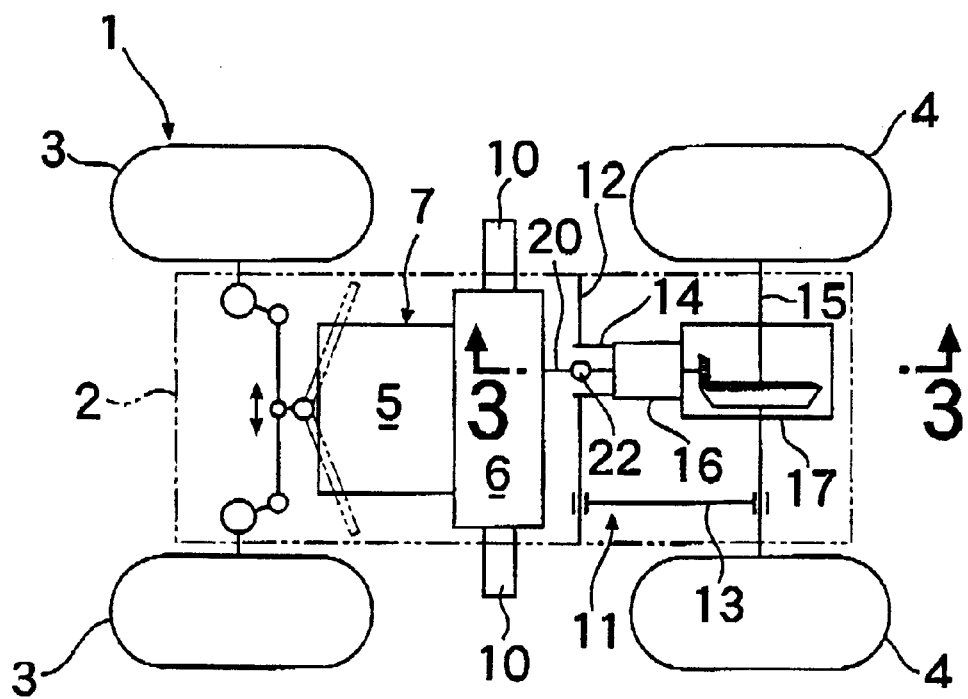
FIG. 2 is a schematic plan view of the buggy vehicle;.

Referring first to FIGS. 1 and 2, reference character 1 shows a buggy vehicle. A pair of left and right front wheels 3 and a pair of left and right rear wheels 4 are vertically movably mounted at front and rear portions of a vehicle body frame 2 of the buggy vehicle through suspensions, and a wide tire of a lower-pressure type generally referred to as a balloon tire is mounted on each of the wheels 3 and 4. A power unit 7 comprising an internal combustion engine 5 and a transmission 6 is mounted at a central portion of the vehicle body frame 2, and a fuel tank 8 and a seat 9 are disposed above the power unit. 7. A pair of left and right steps 10 are mounted at a lower portion of the power unit 7. Therefore, the buggy vehicle 1 is operated by a user sitting astride the seat 9 with his or her both feet put on the steps 10.

The rear suspension 11 for the rear wheels 4 includes a pair of left and right rear forks 13 and 14 which are vertically oscillatably connected to the vehicle body frame 2 through a horizontal pivot 12. The left rear fork 13 carries a left intermediate portion of a laterally extending rear axle 15, and the right rear fork 14 carries a right intermediate portion of the rear axle 15 through a brake housing 16 and a reduction case 17 which will be described hereinafter. The pair of rear wheels 4 are mounted at opposite ends of the rear axle 15, and a cushion unit 18 is mounted between the reduction case 17 and the vehicle body frame 2 for resiliently springing the reduction case 17 downwards.

A transmitting system extending from the power unit 7 to the rear wheels 4 will be described below.

Figure 3:
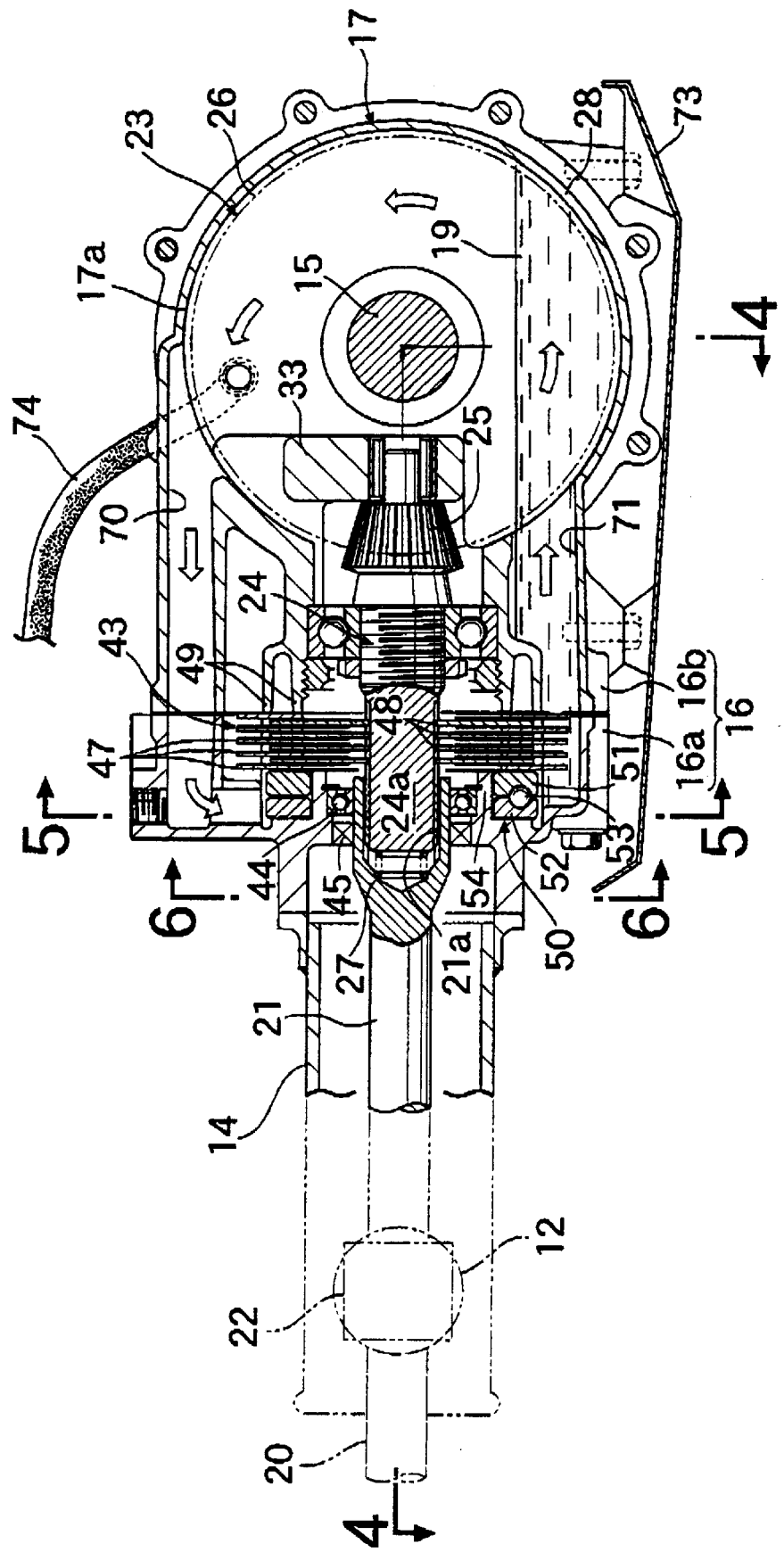
FIG. 3 is a sectional view taken along a line 3—3 in FIG. 2.
Figure 4:
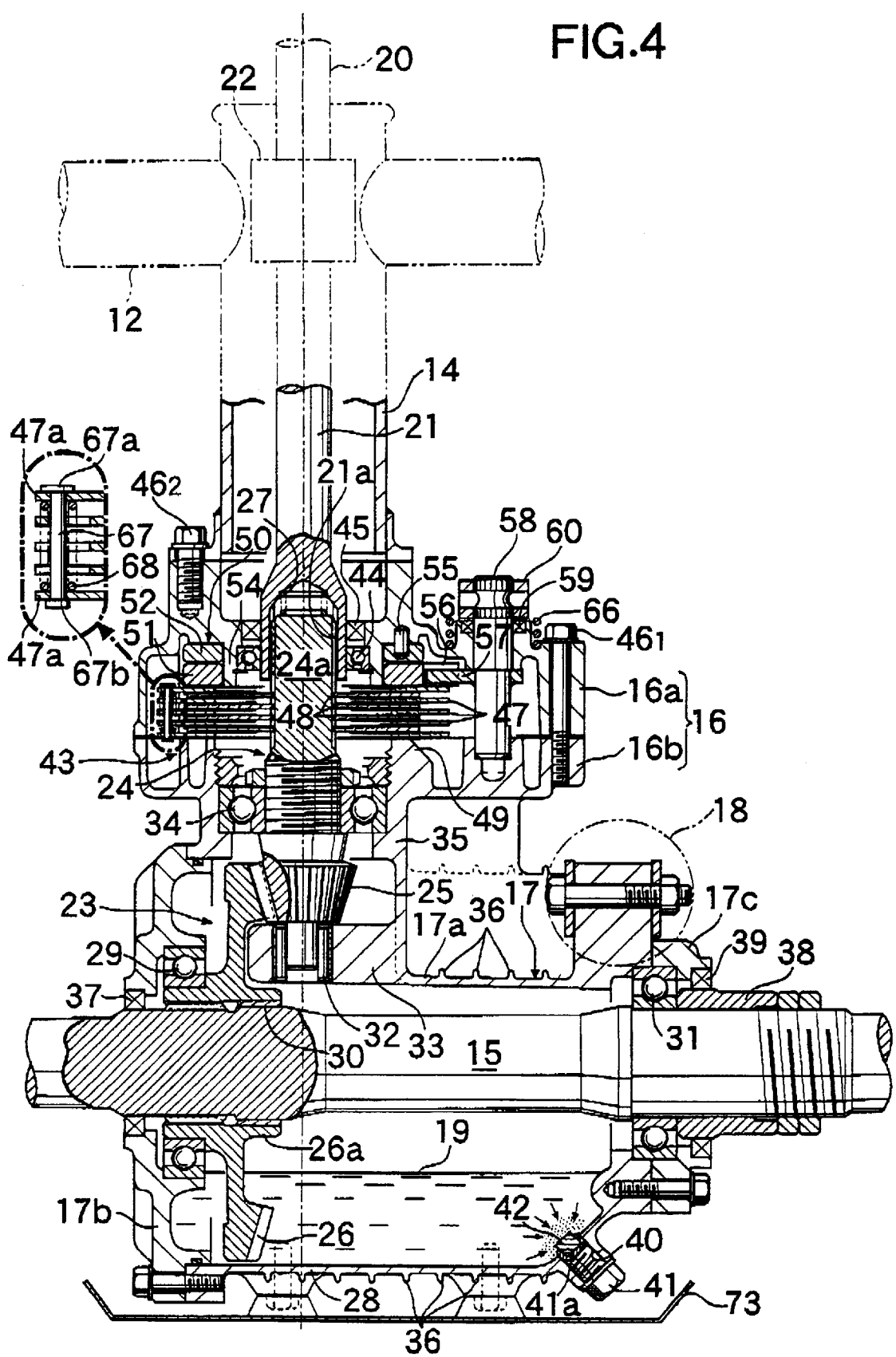
FIG. 4 is a sectional view taken along a line 4—4 in FIG. 3.

As shown in FIGS. 2 to 4, a propelling shaft 21 extending rearwards of the vehicle is connected to an output shaft 20 of the power unit 7 through a universal joint 22 and also connected to the rear axle 15 through a reduction device 23 housed in the reduction case 17. In this case, a bent point of the universal joint 22 is disposed on an axis of the pivot 12, so that the transmission between the output shaft 20 and the propelling shaft 21 is carried out irrespective of the vertical oscillation of the left and right rear forks 13 and 14.

The reduction device 23 comprises an input shaft 24 having a front spline shaft portion 24 a slidably fitted in a spline bore 21a in a rear end portion of the propelling shaft 21, a smaller-diameter drive bevel gear 25 integrally formed at a rear end of the input shaft 24, and a larger-diameter driven bevel gear 26 meshed with the drive bevel gear 25 and spline-coupled to the rear axle 15. A spring 27 is mounted under compression in the spline bore 21a in the propelling shaft 21 for biasing the drive bevel gear 25 in a direction to be meshed with the driven bevel gear 26, The reduction case 17 is comprised of a cylindrical case body 17a having an oil reservoir 28 defined at a lower portion, an end wall member 17b bolted to an opened left end face of the case body 17a, and a bearing cap 17c bolted to a right end wall of the case body 17a. A boss portion 26a of the driven bevel gear 26 is carried by a ball bearing 29 mounted on the end wall member 17b and also carried by the rear axle 15 through a bush 30. Therefore, the end wall member 17b supports the rear axle 15 through the boss portion 26a of the driven bevel gear 26. Further, the rear axle 15 is also supported by a ball bearing 31 mounted on the case body 17 a and the bearing cap 17c.

The case body 17a is integrally formed with a bearing bracket 33 which carries an inner end of the input shaft 24 through a needle bearing 32, and a bearing boss 35 which carries an intermediate portion of the input shaft 24 through a ball bearing 34. A large number of cooling fins 36 are projectingly and integrally provided on an outer peripheral surface of the case body 17a.

An oil seal 37 is mounted on the end wall member 17b to come in close contact with an outer peripheral surface of the rear axle 15. A bearing retaining tube 38 is secured to the rear axle 15 for retaining an inner race of the bearing 31, and an oil seal 39 is mounted on the bearing cap 17c to come into close contact with an outer peripheral surface of the bearing retaining tube 38, whereby the reduction case 17 is constructed liquid-tightly.

Lubricating oil 19 is injected from an oil supply port, which is not shown, into the oil reservoir 28 up to a defined level at which a lower portion of the driven bevel gear 26 is immersed in the lubricating oil 19. A drain bolt 41 is threadedly fitted in a drain bore 40 opening Into a bottom of the oil reservoir 28 to close the drain bore 40. A permanent magnet 42 is accommodated in a accommodating recess 41 a defined at an inner end of the drain bolt 41, so that it adsorbs an iron powder or the like in the lubricating oil 19 stored in the oil reservoir 28.

The brake housing 16 is integrally connected to a front end of the reduction case 17, and a brake device 43 for the rear wheels 4 according to the embodiment of the present invention is housed in the brake housing 16. The brake device 43 will be described below.

As shown in FIGS. 3 to 5, the brake housing 16 is comprised of a housing lid 16b, i.e., a rear housing half, which is integrally formed into a flange-like shape at a front end of the bearing boss 35, and a cylindrical housing body 16a, i.e., a front housing half, whose opened end face is separatably coupled to the housing lid 16b by bolts $46_1$. Mounted on a front end wall of the housing body 16a are a ball bearing 44 which carries the rear end of the propelling shaft 21, and an oil seal 45 which is in close contact with the outer peripheral surface of the propelling shaft 21. Further, the right rear fork 14 formed into a tubular shape to cover the propelling shaft 21 is coupled at its rear end to a front end of the housing body 16a by a bolt $46_2$.

The brake device 43 includes a plurality of rotatable friction brake plates 48 which are slidably and relatively non-rotatably coupled to the spline shaft portion 24a of the input shaft 24, a plurality of stationary friction brake plates 47 which are alternately superposed with the rotatable friction brake plates 48 and slidably and non-rotatably spline-coupled to and supported on an inner peripheral surface of the housing body 16a, an annular pressure receiving portion 49 which is formed on an inner surface of the housing lid 16b to receive the stationary friction brake plate 47 located at the most rear end of the group of the stationary and rotatable friction brake plates 47 and 48, and an operating means 50 which is capable of urging the stationary friction brake plate 47 located at the most front end of the group of the stationary and rotatable friction brake plates 47 and 48, against the pressure receiving portion 49. It is effective for simplifying the structure that the spline shaft portion 24a of the Input shaft 24 is utilized not only for coupling to the propelling shaft 21, but also for coupling to the rotatable friction brake plates 48, as described above.

The operating means 50 includes an annular rotatable cam plate 51 disposed adjacent the most front stationary friction brake plate 47, an annular stationary cam plate 52 opposed to the rotatable cam plate 51, and a ball 53 engaged in cam grooves 51a and 52a defined in opposed surfaces of the cam plates 51 and 52 to form a pair. The stationary cam plate 52 is fitted over a cylindrical shaft 54 formed concentrically with the input shaft 24 on an inner wall of the housing body 16a, and is fixed to the housing body 16a by a pin 55, and the rotatable cam plate 51 is rotatably fitted over the cylindrical shaft 54.

As shown in FIGS. 5 and 7, the cam grooves 51a and 52a are provided in plurality of pairs at circumferentially constant distances therebetween in the opposed surfaces of the cam plates 51 and 52. The cam grooves 51a and 52a of each pair extend circumferentially of the cam plates 51 and 52 and are formed, so that their bottoms gradually shallow toward their respective opposite ends. In usual, the cam grooves 51a and 52a have a ball 53 mounted therein with their deepest portions opposed to each other, and the cam plates 51 and 52 are placed closely to each other. However, when the rotatable cam plate 51 is rotated in a direction A to permit the shallower portions of the cam grooves 51a and 52a to be opposed to each other, a thrust force is generated in the ball 53 to urge the rotatable cam plate 51 in a direction away from the stationary cam plate 52, i.e., toward the group of the rotatable and stationary friction brake plates 48 and 47.

As shown in FIGS. 4 to 6, the rotatable cam plate 51 has a follower arm 56 integrally provided on its outer peripheral surface and turned radially outwards. An operating shaft 58 having a drive arm 57 corresponding to the follower arm 56 is supported by the housing body 16a and the housing lid 16b. One end of the operating shaft 58 protrudes to the outside of the housing body 16a through an oil seal 59 mounted on the housing body 16a, and an operating lever 60 is serration-coupled to such one end of the operating shaft 58. First and second connecting elongated bores 61 and 62 are provided in the operating lever 60 to extend in a direction of rotation of the operating lever 60. A connecting terminal 63a of a first brake wire 63 connected to a brake lever (not shown) is slidably received In the first connecting elongated bore 61, and a connecting terminal 64a of a second brake wire 64 connected to a parking brake lever (not shown) is slidably received in the second connecting elongated bore 62, so that even if any one of the first and second brake wires 63 and 64 is drawn, the operating lever 60 can be rotated to rotate the follower arm 56, i.e., the rotatable cam plate 51 in the direction A by the drive arm 57. In this case, one 63 or 64 of the brake wires at rest does not obstruct the turning of the operating lever 60 by sliding its connecting terminal 63a or 64a in the corresponding connecting elongated bore 61 or 62. A stopper 65 is provided on the housing body 16a for defining the non-operative position of the operating lever. 60, and a return spring 66 is connected to the operating lever 60 for biasing the operating lever 60 toward the stopper 65.

As shown in FIGS. 4 and 5, guide pins 67 each having slip-out preventing bulged portions 67a and 67b at opposite ends are slidably mounted on some of spline teeth 47a of the stationary friction brake plates 47 located at longitudinally opposite outer sides of the group of the rotatable and stationary friction brake plates 48 and 47. A release spring 68 is mounted under compression between the spline teeth 47a and passed through the guide pins 67.

Referring again to FIGS. 3 and 5, the reduction case 17 and the brake housing 16 are provided with an upper oil passage 70 which permits upper portions of the insides of the reduction case 17 and the brake housing 16 to communicate with each other, and a lower oil passage 71 which permits lower portions of the insides of the reduction case 17 and the brake housing 16 to communicate with each other. In the shown embodiment, a portion of the lower oil passage 71 is defined by a spline groove 72 engaged by the spline tooth 47a of the stationary friction brake plate 47 below the inner periphery of the housing body 16a. The lubricating oil 19 in the oil reservoir 28 of the reduction case 17 flows into the brake housing 16 through the lower oil passage 71, so that the lower portions of the rotatable and stationary friction brake plates 48 and 47 is immersed In the oil.

A series of guard plates 73 are secured to the brake housing 16 and the reduction case 17 to cover the lower surfaces of the brake housing 16 and the reduction case 17 for guarding the brake housing 16 and the reduction case 17 from an obstacle on the ground.

Referring again to FIGS. 1 and 3, a breather pipe 74 is connected to the reduction case 17 to communicate with an upper space of the inside of the reduction case 17. The breather pipe 74 is mounted at its outer end to a higher portion of the buggy vehicle 1, e.g., to a lower portion of the fuel tank 8 and bent downwards into a U shape.

The operation of the embodiment will be described below.

During operation of the power unit 7, the power thereof is transmitted to rear axle 15 sequentially via the propelling shaft 21, the input shaft 24, the drive bevel gear 25 and the driven bevel gear 26 to drive the left and right rear wheels 4, thereby allowing the buggy vehicle 1 to travel.

If the brake device 43 is in the non-operative state at this time, the ball 53 is engaged in the deepest portions of the cam grooves 51a and 52a forming the pair, as shown in FIG. 7, thereby detaining the rotatable cam plate 51 at a retreated position, while at the same time, moving the stationary friction brake plates 47 at the longitudinally opposite outer sides away from each other by the resilient force of the release spring 68, Therefore, no drag is caused between the stationary friction brake plate 47 and the rotatable friction brake plate 48, and the rotation of the input shaft 24 is not impeded.

If the first brake wire 63 is drawn by the operation of the brake lever (not shown) to turn the operating lever 60 during traveling of the vehicle, the drive arm 57 rotates the rotatable cam plate 51 in the direction of the arrow A through the follower arm 56. Therefore, the cam grooves 51a and 52a of each pair are displaced relative to each other, so that their shallower portions are opposed to each other. The thrust force generated in the ball 53 as a result of the relative displacement causes the rotatable cam plate 51 to clamp the rotatable and stationary friction brake plates 48 and 47 in cooperation with the pressure receiving portion 49, whereby the input shaft 24 can be braked by a friction braking torque generated between both the friction brake plates 48 and 47. Therefore, the rear wheels 4 can be braked by this input shaft 24 through the reduction device 23 and the rear axle 15.

The braking torque applied to the input shaft 24 above the reduction device 23 is smaller than that applied to the rear axle 15 below the reduction device 23 and hence, the load of the brake device 43 is relatively small and moreover, the braking torque is born substantially equally by the plurality of stationary friction brake plates 47 and the plurality of rotatable friction brake plates 48. Thus, the load of each of the friction brake plates 48 and 47 is further alleviated, thereby providing a considerable reduction in diameter of the stationary friction brake plate 47 and the rotatable friction brake plate 48 and in its turn, in diameter of the entire brake device 43, whereby the level of the brake device above the ground can be raised considerably. Therefore, it is possible for the vehicle to easily travel on an unleveled ground without interference of the brake device 43 with a protrusion on the ground.

The brake device 43 is protected from entering of the earth and sand or the muddy water, because it is housed in the brake housing 16, but the emanation of a friction heat generated in the stationary friction brake plates 47 and the rotatable friction brake plates 48 during braking is obstructed by the brake housing 16. However, such heat is cooled in the following manner.

Since the lower portions of the rotatable and stationary friction brake plates 47 and 48 are immersed in the oil 19 filled in the oil reservoir 28 of the reduction case 17 and in the bottom of the brake housing 16, each of the friction brake plates 48 and 47 is cooled by the oil during rotation thereof.

Moreover, during traveling of the buggy vehicle 1, the larger-diameter driven bevel gear 26 of the reduction device 23 scatters the oil in the oil reservoir 28 by the rotation thereof to lubricate various portions of the reduction device 23. In this case, a portion of the scattered oil is passed through the upper oil passage 70 to enter the brake housing 16, and in accordance with this, the oil in the bottom of the brake housing 16 flows back into the oil reservoir 28 of the reduction case 17 through the lower oil passage 71. The reduction case 17 having the large number of cooling fins 36 on the outer peripheral surface thereof has a large outer surface area and is cooled satisfactorily by the open air. Therefore, the oil which has cooled the group of the rotatable and stationary friction brake plates 48 and 47 is cooled by the reduction case 17 when it has been returned to oil reservoir 28. The oil cooled in this manner is scattered again by the rotation of the driven bevel gear 26 and supplied to the brake housing 16. By the repetition of such scattering and returning of the oil, the brake device 43 is effectively cooled.

In this case, to promote the flowing of the oil from the reduction case 17 into the brake housing 16, it is effective that the upper oil passage 70 is provided with a forward declining gradient. In addition, to promote the returning of the oil from the brake housing 16 to the oil reservoir 28, it is effective that the lower oil passage 71 is provided with a rearward declining gradient.

The upper space in the reduction case 17 communicates with the atmosphere through the breather pipe 74 and hence, if a variation in pressure is produced in the reduction case 17 and the brake housing 16 communicating with each other in accordance with a variation in temperature of the oil 19 or the like, the reduction case 17 and the brake housing 16 can breathe the open air through the breather pipe 74. Therefore, the leakage of the oil due to the rising of the internal pressures in the reduction case 17 and the brake housing 16 can be avoided. Moreover, since the outer end of the breather pipe 74 lies at a higher level on the buggy vehicle 1 and is bent downwards, it is possible to prevent the entering of dusts or rain water into the breather pipe 74 even during traveling of the vehicle.

When an iron-based cut power or friction power is incorporated in the oil circulating through the reduction case 17 and the brake housing 16, the cut power or friction power, when it reaches the oil reservoir 28, is adsorbed to the magnet 42 mounted at the tip end of the drain bolt 41 in the drain bore 40. Therefore, it is possible to prevent the cut powder or friction powder from re-circulating along with the oil to enter the inside of the brake device 43, particularly, the clearance between the stationary friction brake plate 47 and the rotatable friction brake plate 48 to hasten the wear of them. This can contribute to an enhancement in durability of the brake device.

The cut powder or friction powder adsorbed to the magnet 42 on the drain bolt 41 is removed from the magnet, when the drain bolt 41 is removed to discharge the dirty oil from the drain bore 40 for replacement of the oil in the oil reservoir 28.

Since the brake housing 16 comprises the housing lid 16b, i.e., the rear housing half, integrally formed at the front end of the reduction case 17, and the housing body 16a, i.e., the front housing half, separatably coupled to the housing lid 16b by the bolt $46_1$, the construction of the brake housing 16 can be simplified. Moreover, since the brake housing 16 is supported on the reduction case 17, an exclusive torque link for connecting the brake housing 16 to the vehicle body to prevent the rotation of the brake housing 16 is not required, If the bolt $46_1$ is removed to separate the housing halves 16a and 16b from each other, the inspection and servicing of the brake device 43 can be easily carried out, leading to a good maintenance.

Although the embodiment of the present invention has been described in detail, it will be understood that the present invention is not limited to the above-described embodiment,-and various modifications in design may be made without departing from the spirit and scope of the invention defined in claims.

For example, the brake device 43 may be constructed so that the rotatable friction brake plates 48 are spline-coupled to the propelling shaft 21, and the operating means 50 of the brake device 43 may be constructed into a hydraulic type. The rear axle 15 is divided into left and right portions which may be connected to each other through a differential having a differential limiting device.

What is claimed is:

1. A brake device for a buggy vehicle including a power unit, a propelling shaft connected to an output shaft of the power unit and extending longitudinally of the vehicle, a rear axle extending laterally of the vehicle, a reduction device which connects said propelling shaft and said rear axle to each other to reduce and transmit a power from the propelling shaft to the rear axle, and a pair of left and right rear wheels which each have a lower-pressure tire and which are mounted at opposite ends of said rear axle, said brake device comprising a plurality of rotatable friction brake plates which are axially slidably and relatively non-rotatably coupled to the propelling shaft or a transmitting shaft rotated with said propelling shaft, a plurality of stationary friction brake plates alternately superposed with said rotatable friction brake plates, a non-rotatable brake housing which houses said pluralities of the rotatable and stationary friction brake plates therein and which supports said stationary friction brake plates for axial sliding movement and against rotation, a pressure-receiving portion provided in said brake housing to carry one of opposite sides of said pluralities of the rotatable and stationary friction brake plates, and an operating means which is operated by the operation of a brake lever during travelling and which urges the other side of said pluralities of the rotatable and stationary friction brake plates against said pressure receiving portion, wherein said brake housing is comprised of a rear housing half seamlessly and integrally formed at a front end of a reduction case which houses said reduction device, and a front housing half separatably bolted to said rear housing half, lubricating oil scattered by rotation of a rotary member of said reduction device is stored in a lower portion of said reduction case, and wherein a series of upper oil passages for guiding the oil scattered by rotation of said rotary member into said pluralities of rotatable and stationary friction brake plates in said brake housing and a series of lower oil passages for returning the oil from the inside of said brake housing to said reduction case are each formed over said rear housing half and said front housing half.

2. A brake device for a buggy vehicle according to claim 1, wherein said reduction device includes a spline shaft portion which is fitted into a spline bore provided in a rear end of said propelling shaft, and said rotatable friction brake plates are slidably coupled to said spline shaft portion.

3. A brake device for a buggy vehicle according to claim 1, wherein the oil in said reduction case flows into a bottom of said brake housing, so that a lower portion of said pluralities of the rotatable and stationary friction brake plates is immersed in the oil.

4. A brake device for a buggy vehicle according to claim 1, wherein said operating means includes a stationary cam plate fixed to said brake housing, a rotatable cam plate rotated by an operating lever outside said brake housing, and a ball interposed between both of said cam plates, whereby said pluralities of said rotatable and stationary friction brake plates is urged against said pressure receiving portion by a thrust force which is generated by said ball as a result of rotation of said rotatable cam plate upon operation of said operating lever so as to move both of said cam plates away from each other.

5. A brake device for a buggy vehicle according to claim 1, further including a breather pipe connected to said reduction case so as to communicate with an upperspace of inside of said reduction case with an outer end of the breather pipe opening to the atmosphere.

6. A brake device for a buggy vehicle according to claim 1, further including a guard plate mounted to said brake housing and said reduction case to cover their lower surfaces.

7. A brake device for a buggy vehicle according to claim 1, further including a drain bolt which has a magnet mounted at a tip end thereof and which is threadedly mounted in a drain bore that is provided in a bottom wall of said reduction case.

8. A brake device for a buggy vehicle according to claim 1, further including a release spring interposed between the outer side brake plates located at opposite outer sides of said pluralities of the rotatable and stationary friction brake plates for biasing these outer side friction brake plates in directions away from each other.

9. A brake device for a buggy vehicle according to claim 1, wherein said rear housing half is comprised of a housing lid which is seamlessly and integrally formed into a flange shape at the front end of said reduction case, said front housing half is comprised of a cylindrical housing body bolted to said housing lid in a manner separatable at an opened end face thereof, and said housing body houses said pluralities of rotatable and stationary friction brake plates therein and is provided with said operating means.

10. A brake device for a buggy vehicle according to claim 1 or claim 9, wherein said upper oil passage is formed facing a front end wall of said front housing half.

11. A brake device for a buggy vehicle including a power unit, a propelling shaft connected to an output shaft of the power unit and extending longitudinally of the vehicle, a rear axle extending laterally of the vehicle, a reduction device which connects said propelling shaft and said rear axle to each other to reduce and transmit a power from the propelling shaft to the rear axle, and a pair of left and right rear wheels which each have a lower-pressure tire and which are mounted at opposite ends of said rear axle, said brake device comprising a plurality of rotatable friction brake plates which are axially slidably and relatively non-rotatably coupled to the propelling shaft or a transmitting shaft rotated with said propelling shaft, a plurality of stationary friction brake plates alternately superposed with said rotatable friction brake plates, a non-rotatable brake housing which houses said pluralities of the rotatable and stationary friction brake plates therein and which supports said stationary friction brake plates for axial sliding movement and against rotation, a pressure-receiving portion provided in said brake housing to carry one of opposite sides of said pluralities of the rotatable and stationary friction brake plates, and an operating means which is operated by the operation of a brake lever during travelling and capable of urging the other side of said pluralities of the rotatable and stationary friction brake plates against said pressure receiving portion, wherein lubricating oil scattered by rotation of a rotary member of said reduction device is stored in a lower portion of said reduction case which houses said reduction device, and wherein an upper oil passage for guiding the oil scattered by rotation of said rotary member into said pluralities of rotatable and stationary friction brake plates in said brake housing and a lower oil passage for returning the oil from the inside of said brake housing to said reduction case are provided between said brake housing and said reduction case.

* * * * *